United States Patent [19]

Richards

[11] Patent Number: 5,028,196

[45] Date of Patent: Jul. 2, 1991

[54] LID OPENING DEVICE/LOADER ASSEMBLY AND METHOD OF COLLECTING RECYCLABLE MATERIALS

[75] Inventor: Idwall C. Richards, Banora Point, Australia

[73] Assignee: Jayrich Engineering Pty Ltd, New South Wales, Australia

[21] Appl. No.: 398,153

[22] Filed: Aug. 24, 1989

[51] Int. Cl.⁵ .............................................. B65G 21/02
[52] U.S. Cl. ................................... 414/406; 414/411; 414/421
[58] Field of Search ............... 414/403, 406, 407, 408, 414/421, 411

[56] References Cited

U.S. PATENT DOCUMENTS

| 2,683,544 | 7/1954 | Linde | 414/407 |
| 2,860,795 | 11/1958 | Zoller | 414/407 |
| 3,844,615 | 10/1974 | Anderson | 414/421 X |

FOREIGN PATENT DOCUMENTS 543607 10/1981 Australia .

| 655369 | 1/1938 | Fed. Rep. of Germany | 414/407 |
| 699322 | 7/1930 | France | 414/407 |
| 489795 | 8/1938 | United Kingdom | 414/406 |

Primary Examiner—Joseph E. Valenza
Assistant Examiner—Keith L. Dixon
Attorney, Agent, or Firm—Pasquale A. Razzano

[57] ABSTRACT

During a normal waste collection service, an automated loading mechanism is used to empty the contents of a bin into a refuse vehicle. The bin has a closable lid which includes a message on its underside such that the message is displayed when the lid is open. The message indicates that recyclable wastes, such as glass, paper or the like are to be collected in a subsequent collection to the normal waste collection. A lid opening device including a lever arm which operates to automatically open the lid of the bin is employed during an emptying operation so as to display the message. This message indicates to the homeowner that the required recyclable waste can be placed into the bin, and by closing the lid, the collection service is signaled to empty the contents of the bin.

10 Claims, 6 Drawing Sheets

LID OPENING DEVICE/LOADER ASSEMBLY AND METHOD OF COLLECTING RECYCLABLE MATERIALS

This invention relates to waste collection and in particular to a method and apparatus which facilitates collection of recyclable waste material.

Waste collection has become a semi-automated procedure. Refuse collection vehicles are known which include a loading mechanism which can engage a specialised bin to empty the contents of the bin into a container carried by the refuse vehicle.

The refuse vehicle usually includes a vehicle body on which the container is carried and the loading mechanism is usually mounted adjacent a side or front of the vehicle body. In some cases, the loading mechanism is mounted on a remote controlled hoist such as a hydraulic hoist assembly or on a suitable remote controlled retractable arm assembly. Only one operator is required to load refuse from a refuse bin into the container of the refuse vehicle. In these arrangements, the loading mechanism usually includes a bin engagement means. The bin engagement means can be moved by the hoist into a bin engagement position whereafter on retraction of the hoist an emptying operation is employed to empty the contents of the bin into the container carried by the refuse vehicle.

Examples of vehicle mounted hoist assemblies and/or retractable arm assemblies are given in the following patent specifications: U.S. Pat. Nos. 3,765,554; 3,604,577; and 4,401,407 and Australian Patent Specification Nos. 75458/81; 46,513/85 and 21,063/88. The disclosure of these specifications is incorporated into the present specification.

The present invention is particularly although not exclusively applicable to refuse collection using a remote controlled hoist assembly or a retractable arm assembly such as those illustrated in the above patent specifications. Australian Patent Application No. 21,063/88 also to the present applicant, describes a preferred retractable arm assembly for a loading mechanism and it is preferable to employ the retractable arm assembly of Australian Patent Application No. 21,063/88 in conjunction with the present invention but other remote controlled assemblies can be employed.

Waste collection services generally collect waste at say weekly intervals. It is usual for a homeowner to position bin containing refuse at curbside prior to collection. It is customary for three operators to be employed during refuse collection. One operator usually drives the refuse vehicle while one or more operators walk beside the vehicle and manually place a refuse bin onto a semi-automated loading mechanism which on activation of a switch, empties the bin into the refuse container by moving the bin from a rest position to an emptying position and then back to the rest position whereafter the bin is manually removed from the loading mechanism and replaced at curbside. Australian Patent Application No. 21,063/88 describes a refuse collection vehicle which includes a retractable arm assembly mounted at the side of the vehicle and which can be operated by a single operator. The loading mechanism is mounted at the end of the retractable arm assembly.

It is desirable to recycle useful waste material from domestic refuse. Glass, cans and paper are commercially viable waste materials for the purpose of recycling. Homeowners are becoming conscious of the need to conserve resources and consequently have in recent times, shown a willingness to store recyclable material to be discarded separately from other domestic refuse.

In the past however, collection of recyclable materials has been dependant to a large degree on central community based collection sites such as schools and charity organisations. The homeowner was required to transport his recyclable waste material to the central site where the material could be later collected and transported to the recycling plant. Alternatively, separate collection services provided the homeowner with additional bins for the recyclable waste and the recyclable waste was collected separately of other domestic and commercial waste.

It has been proposed to utilise a single collection bin for both non-viable or non-recyclable and recyclable waste material and to provide two or more collections on the one day, the first collection being for normal non-recyclable waste materials and the second collection being for recyclable waste materials. The advantage of this collection scheme is that existing curbside collection techniques can be used and only a single bin is required. The main problem with applying this scheme to current waste collection techniques using specialised bins and semi-automated or automated procedures is that it cannot be readily deduced from the appearance of a bin after a first collection whether the bin is empty or whether the bin contains recyclable waste material and whether the bin should be emptied or not. In other words, after the first collection of the non-recyclable waste material, the bins would all be empty, some homeowners being aware of the subsequent collection on the same day would place their recyclable waste materials into the emptied bin, while other homeowners who do not require a collection of recyclable waste material on that particular day, are likely to leave their empty bin at the curbside. The operator in the subsequent collection service would not be able to readily deduce which of the bins need emptying and which do not.

It is a principal object of the present invention therefore to overcome or substantially ameliorate the above described deficiencies of the prior art systems for collection of waste material.

The present invention therefore resides in one broad aspect in a loading mechanism for a refuse vehicle, the loading mechanism being of the type which during a bin emptying operation can move a bin having a closure member from an initial rest position to an emptying position and then to a final rest position, the improvement comprising a closure member opening means provided in association with said loading mechanism to open the closure member of the bin prior to the bin achieving the final rest position.

Thus, by employing the present invention having a closure member opening means, it is possible for the bins to be emptied leaving their respective closure members open during a first collection service to indicate to the homeowner that there is a subsequent collection service due for that day. A homeowner desiring a subsequent collection may then close the closure member which then indicates to the operator of the subsequent service that the bin is to be emptied.

In another aspect, the invention resides in a refuse vehicle including a loading mechanism mounted on the refuse vehicle and being operable during a bin emptying operation to move a bin from an initial rest position to an emptying position and then to a final rest position, said bin having a closure member, the loading mechanism having a closure member opening means to open the closure member of the bin prior to the bin achieving the final rest position.

A retractable arm assembly or hoist assembly can be employed between the loading mechanism and the refuse vehicle. The retractable arm assembly preferably includes a first arm having one end adapted for pivotal connection to a side or front of a refuse vehicle, a second arm having one end pivotally connected to the other end of said first arm and the other end of the second arm being connected to the loading mechanism. Advantageously, the retractable arm assembly is a retractable arm assembly of the type described in Australian Patent Application No. 21,063/88 but other retractable arm assemblies may be employed.

Accordingly, in a further aspect, the invention resides in a refuse vehicle having a vehicle body and including a hoist or retractable arm assembly having one end mounted to the vehicle body, a loading mechanism mounted to the other end of the hoist or retractable arm assembly and being adapted to engage a bin and on retraction of the hoist or retractable arm assembly, empty the contents of the bin into a container on the refuse vehicle and return the bin to a final rest position, the bin having a closure member, a closure member opening means associated with the loading mechanism to open the closure member on said bin prior to the bin achieving the final rest position.

The bin can be a conventional garbage can or can be a specialised bin of the type used in automated collection of refuse and is preferably a wheeled bin of the type disclosed in Australian Patent Application No. 21,063/88.

A suitable mechanical closure member can employ a sliding panel. The sliding panel can be operative to expose a message when open and to conceal a message when closed. In a further form, a hinged flap can be used to expose the message at one pivotal position of the flap and can conceal the message at another pivotal position of the flap. Preferably, the bin has an upper portion to which the flap is hinged.

In one advantageous form, the closure member is combined with an operational feature of the bin in order to attract attention to the normally concealed message. Where a wheeled container is employed, the closure member can initiate the action of a brake preventing rotation of the wheels of the bin. In this form, the message can be displayed adjacent a brake release so as to draw attention to the message when a user releases the brake. Where a hinged flap is employed, the hinge flap can be formed as at least part of a lid of the bin, the lid of the bin being the operational feature used to assist in drawing attention to the message. The normally closed lid can conceal the message and be left open to display the message. During the process of closing the lid, the homeowner's attention is thereby drawn to the message.

The message can be of any desired form and preferably indicates that the bin is available for reception of a particular type of recyclable material and that there will be a further collection service on that day. The message can include indicia exposed on opening of the closure member. The indicia can indicate the form of recyclable material that is to be placed into the bin for collection. Where a sliding panel or hinged flap is employed, the indicia can be located on a normally concealed surface of the panel or flap.

In the embodiment where the flap comprises at least part of the bin lid, the message can be provided by indicia located on the inside of the bin lid so as to be normally concealed by the closed lid. The indicia is exposed when the lid is opened. In this form, the hinged flap can comprise the whole lid of the container and the indicia can be provided on a sticker or label secured to the inside of the lid. The indicia may also be embossed or painted on the lid.

In this form, the first collection service for the day on which a subsequent service is to be provided would provide on that day the additional service of leaving all bins with their lids open thereby exposing the indicia marked on the underside of the bin lid. A homeowner seeing the exposed indicia on the underside of the lid, would be reminded of the following collection service and would be prompted to place the requisite recyclable waste into the bin. The homeowner would then be instructed to close the lid if collection was required. During the subsequent service the operator would only stop and empty those bins where the lid was closed. The indicia on the underside of the lid would instruct the homeowner to close the lid to ensure collection.

The closure member opening means can be electrically or mechanically operable and can be operable to open the closure member at any stage before, during or after a bin emptying operation. The closure member opening means can be deactivated if it is desired not to open the closure member.

The closure member opening means is preferably mechanically operable between a closure member engaged position and a closure member disengaged position. It is preferable that the closure member opening means be lockable in the closure member disengaged position so that the closure member need not be opened if this is desirable. It may be desirable not to open the closure member on those days where a subsequent service is not to be provided.

The closure member opening means can be attached to the loading mechanism and is preferably attached to the bin engagement means. Advantageously, the closure member opening means is readily detachable from the loading mechanism, so that it need only be used on those days where a subsequent collection is to be provided.

The closure member opening means preferably operates automatically to open the closure member in response to motion of the loading mechanism during an emptying operation.

In one aspect, the closure member opening means can be a lid opening device adapted to automatically open the lid of a bin to expose a message normally concealed by the closed lid. In this aspect therefore, the invention resides in a lid opening device for a refuse vehicle loading mechanism of the type adapted to empty a bin by moving the bin from an initial rest position to a emptying position and then to a final rest position, the lid opening device comprising an arm having a proximal end attachable to the loading mechanism and a free end remote from the loading mechanism, the free end having a lid engagement means, the arrangement being that when operatively attached to the loading mechanism, the lid opening device can be activated to move the lid engagement means between a lid disengaged position and a lid engaged position whereupon the lid opening device can open a lid of a bin. Preferably, the lid opening device operates automatically to open the lid while the bin is being emptied by the loading mechanism.

The proximal end of the arm can be attached to or engageable with one or more drive means in order to drive the arm to move the lid engagement means between its respective positions. The drive means can be a solenoid connected to or adjacent the proximal end of the arm via a connecting rod so that as the solenoid extends or retracts the connecting rod the arm toggles the lid engaging means between its respective positions.

The arm can be in the form of a lever arm pivotally connected to the loading mechanism at a point intermediate its ends. The lever arm is preferably attachable to the loading mechanism at a point adjacent its proximal end. The lever arm is preferably a bent lever arm having its pivotal connection coincident with the bend in the lever arm.

The lid engagement means is preferably mounted adjacent or at the free end of the lever arm so that as the lever arm pivots about its pivotal connection to the loading mechanism, the lid engagement means moves between its respective positions.

Where a lever arm is employed, the drive means can comprise a plurality of camming surfaces or striker plates mounted on the loading mechanism at spaced locations and which are adapted to strike the lever arm adjacent its proximal end at different stages of a bin emptying operation so that the lever arm pivots about the pivot connection to the loading mechanism.

Advantageously, detent means is provided to inhibit motion of the arm. The detent means can include a detent plate having first and second spaced recesses for housing the arm when in respective positions corresponding to the disengaged and engaged positions of the lid engaging means. The first and second recesses can be separated by a ridge which inhibits motion of the lever arm between the recesses. Preferably, the detent plate is biased against the arm.

The free end of the arm can include an appendage serving as the lid engagement means. The appendage can comprise a lever pivotally connected adjacent the free end of the arm. The lever is preferably a first class lever pivotally connected adjacent the free end of the arm, the first class lever preferably has a roller at one end adapted to contact the bin lid and a connecting rod pivotally connected at the other end of the first class lever so that on operation of the loading mechanism, the connecting rod applies force to the first class lever in order for the first class lever to pivot about the pivot connection to the arm. The connecting rod is preferably connected at its other end to the loading mechanism.

In order that the invention may be more readily understood and be put into practical effect, reference will now be made to the accompanying drawings and wherein:

FIG. 2B is a schematic view illustrating the

Figure 1:
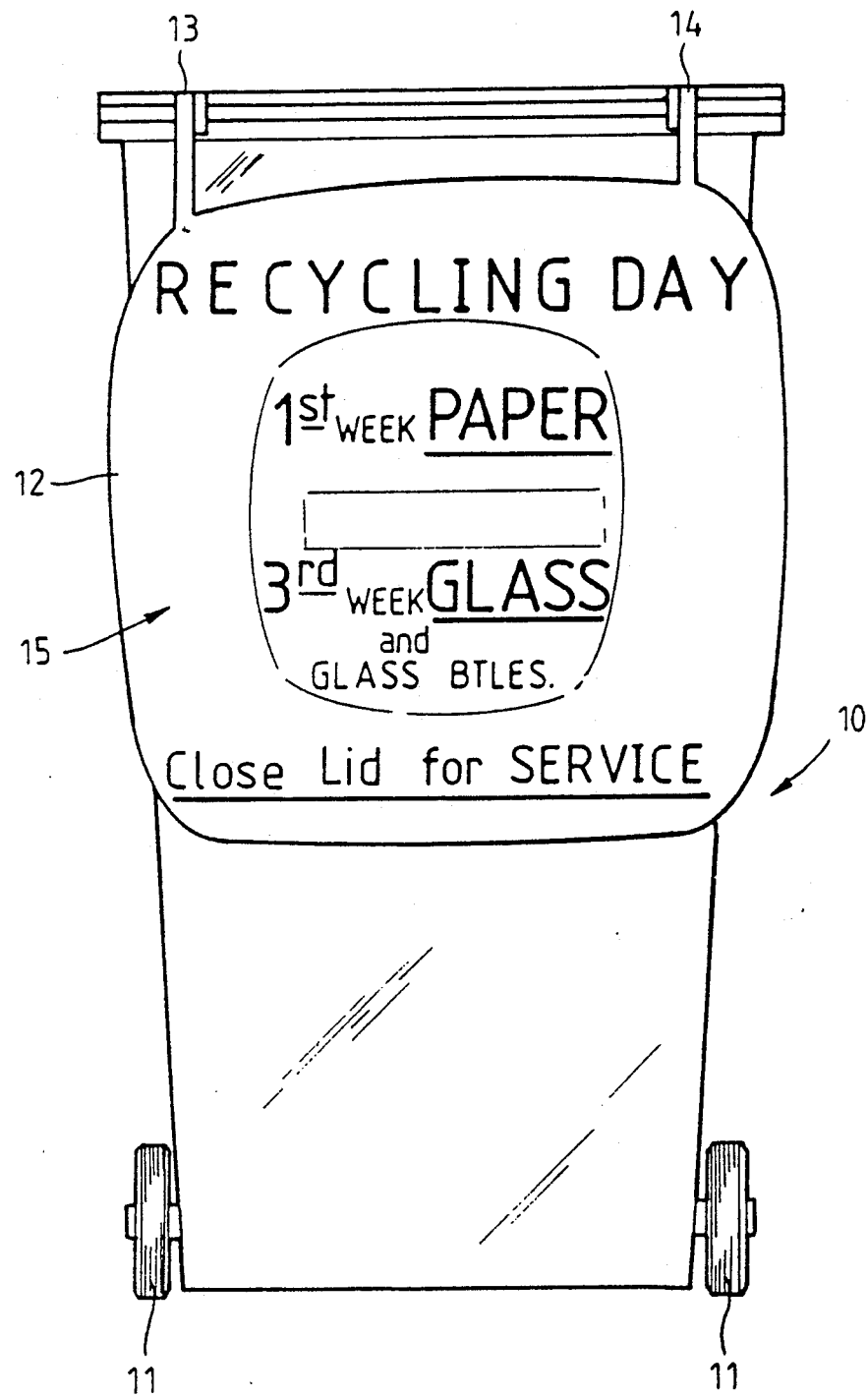
FIG. 1 is an elevation view of a preferred bin for use in conjunction with the present invention.

Referring to the drawings and initially to FIGS. 1, there is illustrated a bin 10 which in this case is a wheeled bin having two wheels 11 and a closure member which in this case is a hinged flap which also forms the lid 12 of the bin. The lid 12 is hinged at 13 and 14 and is illustrated in its open position.

As can be seen, a message 15 is displayed on the inside of the lid.

In this embodiment, the closure member comprises the lid 12 and the message is displayed when the lid 12 is open and is concealed when the lid 12 is closed.

Figure 2A:
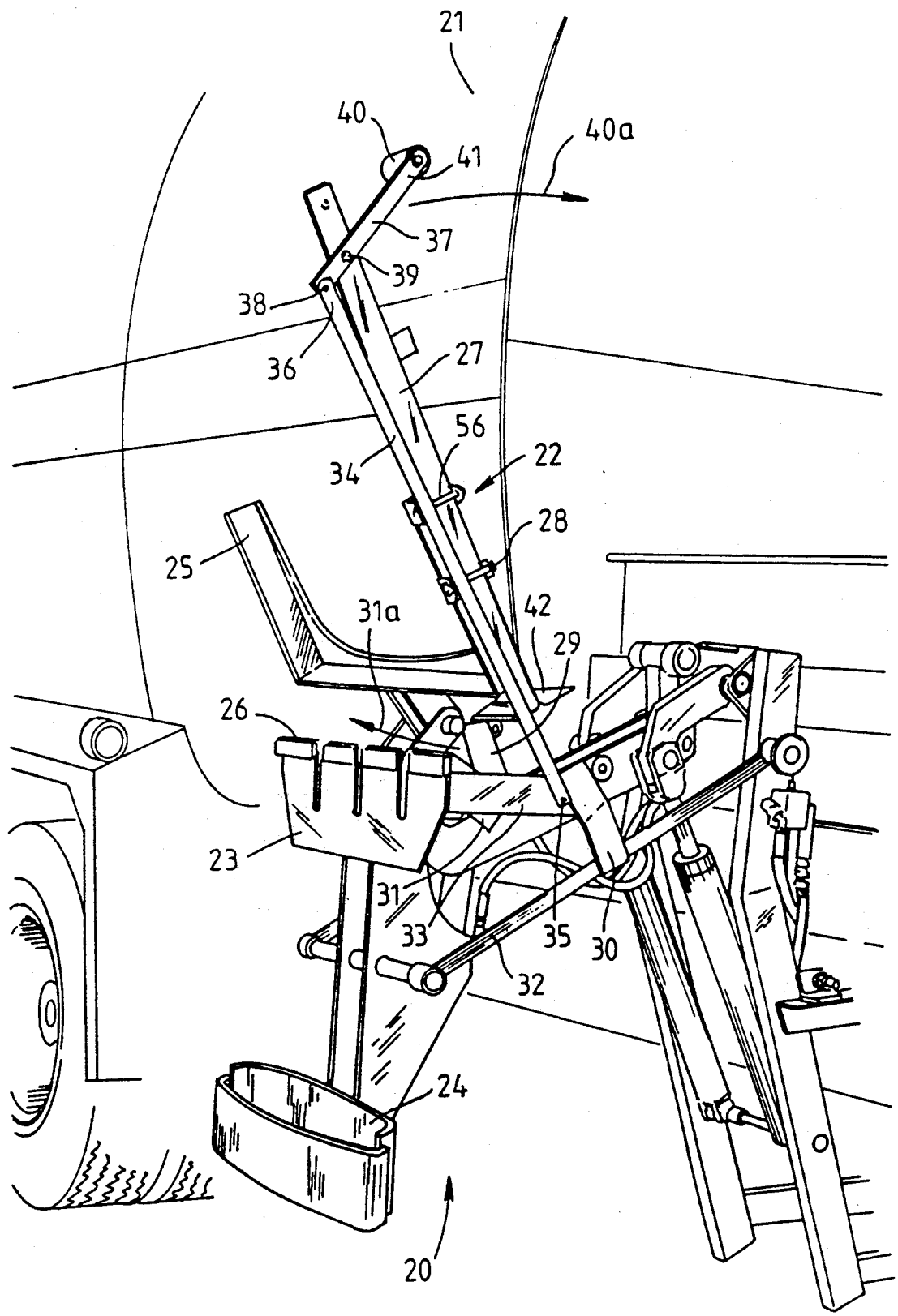
FIG. 2A is a perspective view illustrating a loading mechanism constructed in accordance with the present invention.

In FIGS. 2A, 2B, 3 and 4 there is illustrated a loading mechanism constructed in accordance with the present invention. Referring to FIG. 2A, there can be seen a loading mechanism 20 mounted on the side of a refuse vehicle 21. A retractable arm assembly (21a in FIG. 5) is located between the loading mechanism 20 and the refuse vehicle. This is more clearly seen in FIG. 5 showing the retractable arm assembly 21a in its retracted position. The retractable arm assembly is the same as that described in Australian Patent Application No. 21,063/88 and reference should be made to that application for a detailed description of the operation of the retractable arm assembly.

The finger plate 23, bin alignment means 24 and clamp 25 collectively form a bin engagement means. The upper portion 26 of the finger plate is adapted to fit beneath a lip on a bin and the clamp 25 is adapted to clamp the bin lip against the finger plate (see FIG. 6).

The loading mechanism is preferably adapted to operate automatically once a bin is engaged with the bin engagement means. During this automatic operation, the loading mechanism moves a bin from an initial rest position to an emptying position and then back to a final rest position where it disengages the bin. In the embodiment of FIGS. 2A, 2B, 3 and 4 the closure member opening means comprises a lid opening device 22 which operates in response to this automatic reciprocating motion of the loading mechanism. The lid opening device 22 in the illustrated embodiment comprises a bent lever arm 27 which is pivotal about a pivot 28 (as shown more clearly in FIG. 2A and see also FIG. 4). An abutment 29 is provided at the proximal end of the lever arm 27. The abutment 29 is positioned so as to engage in turn with first and second striker plates 30 and 31 respectively during motion of the loading mechanism. The plates 30 and 31 provide angled camming surfaces which act on the abutment 29 of arm 27 so that arm 27 pivots. The striker plate 30 is welded or otherwise secured to the linkage arm 32 and the striker plate 31 is welded or otherwise secured to the rear side of the finger plate 23. The striker plate 3 is shown partially concealed behind a mounting plate 33.

The abutment 29 is shown partially concealed behind striker plate 31 and is in the position illustrated riding over the camming surface provided by striker plate 31. The roller 40 is located in a lid engagement position. As the abutment will ride against the camming surface provided by striker plate 31 which will force the abutment 29 in the direction of the arrow 31a this in turn will cause the arm 27 to pivot about pivot 28 and roller 40 to move in the direction of arrow 40a. This process is reversed when the abutment rides over the camming surface provided by striker plate 30. In the direction of the view shown in FIG. 2A when the clamp is in the clamped position and the loading mechanism fully extended to its emptying position (as shown in FIG. 5) the abutment 29 will partially conceal the strike plate 30 as the abutment 29 rides over the camming surface provided by striker plate 30.

Figure 2B:
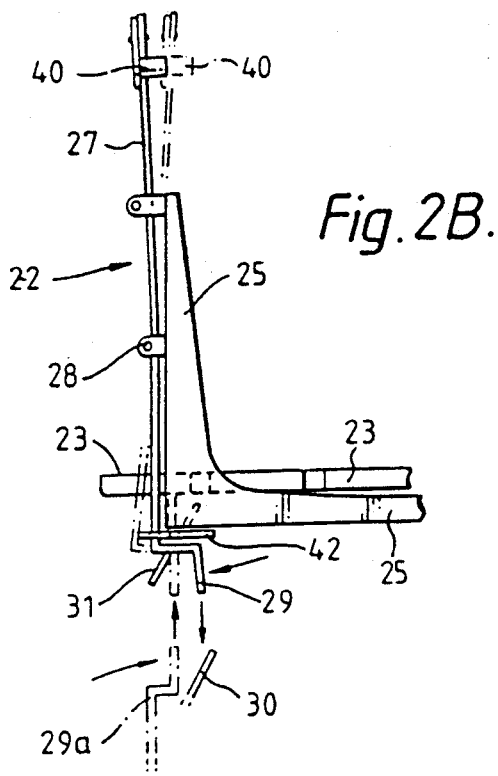

FIG. 2B illustrates the relationship between the abutment 29 and the striker plates 30 and 31 in schematic fashion with the lever arm shown in phantom for the situation where the roller 40 is in its lid engaged position. The general direction of approach of the abutment 29 in each case toward the respective striker plates 30 and 31 and the abutment's subsequent movement on contact with the striker plates is shown by the arrows. The general direction from which the abutment 29 approaches the striker plate 31 is shown in phantom at 29a.

It will be appreciated therefore that the operation of the lid opening device is automatic on operation of the loading mechanism. A mounting plate 33 is welded or otherwise secured to the rear side of the finger plate 23 and a connecting rod 34 is pivotally connected to the plate 33 at 35. The other end 36 of the connecting rod 34 is pivotally connected to the first class lever 37 at 38. The lever 37 is pivotally connected to the lever arm 27 at 39. A roller 40 is attached to the free end 41 of the lever 37. The lever 37 and roller 40 serve as a lid engagement means.

Figure 4:
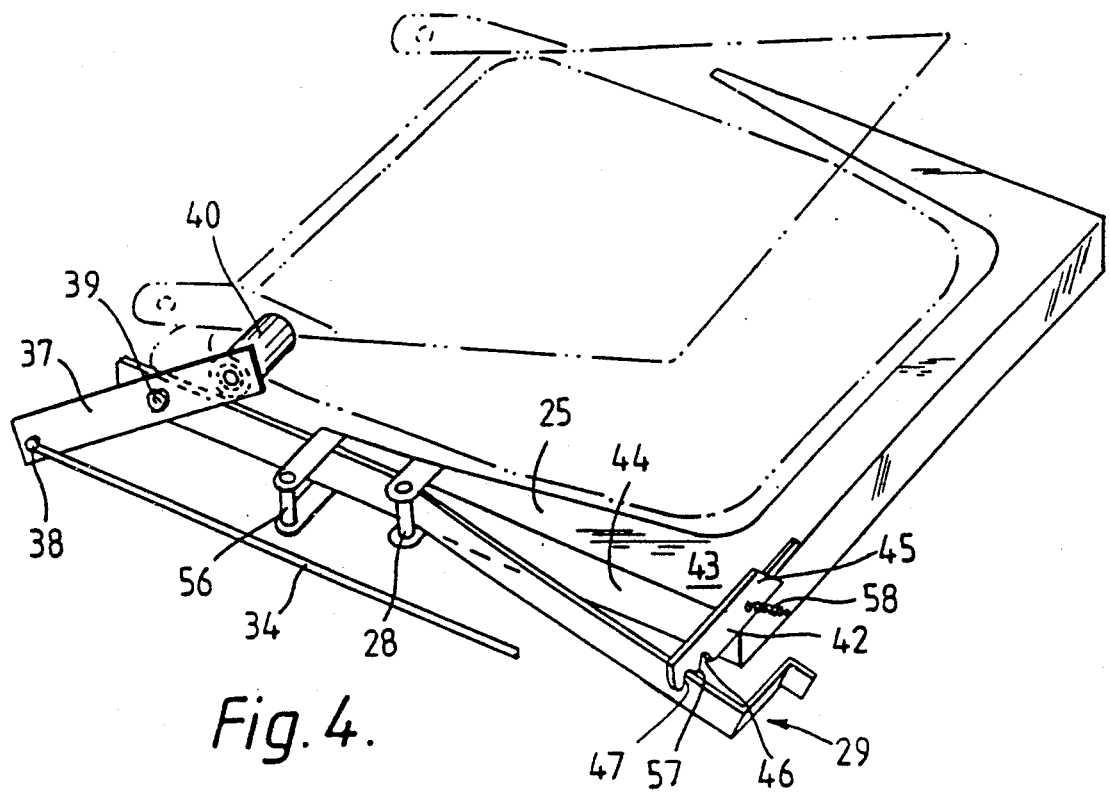
Figure 5:
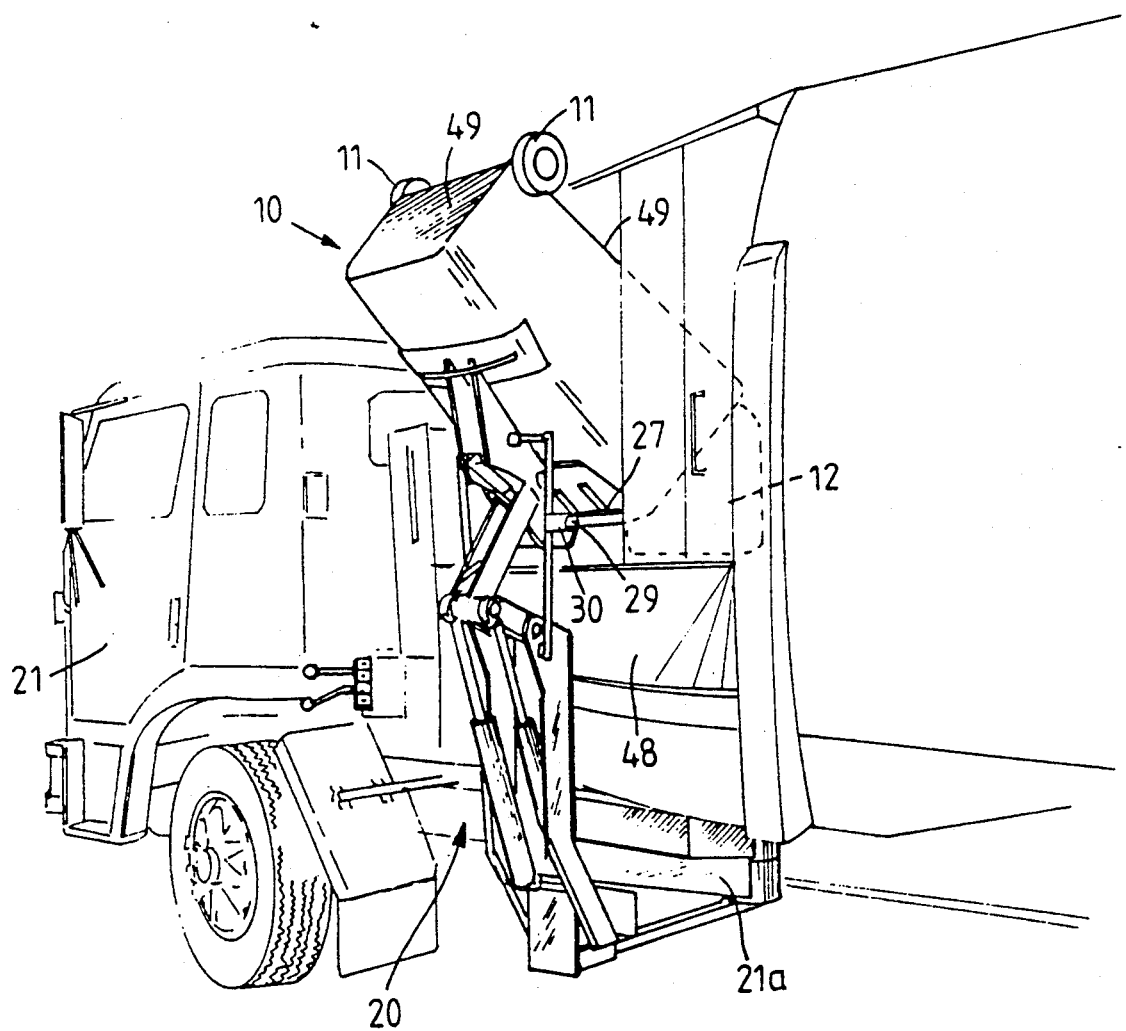
FIGS. 5 and 6 are perspective views illustrating the operation of the loading mechanism of FIG. 2.

The lid opening device 22 is readily detachable from the loading mechanism simply by removing the pivot pins of pivots 35 and 28 and stop pin 56 (see FIG. 4). Thus the same vehicle can be used for say an initial collection where the lid opening device is employed and then a subsequent collection where the lid opening device is not employed.

During operation of the loading mechanism, the abutment 29 engages with the striker plate 30 causing the lever arm 27 to pivot about pivot 28 and the roller 40 to move in the direction of the clamp 25. The abutment 29 thereafter strikes the second striker plate 31 which causes the pivot arm 27 to move about pivot 28 and the roller 40 to move away from the clamp 25. Thus, as the loading mechanism moves through its reciprocating stroke the lever arm 27 and thus the roller 40 toggle between two positions the first position being a lid engagement position and second position being a lid disengaged position. The reason for this operation will be further clarified below.

Figure 3:
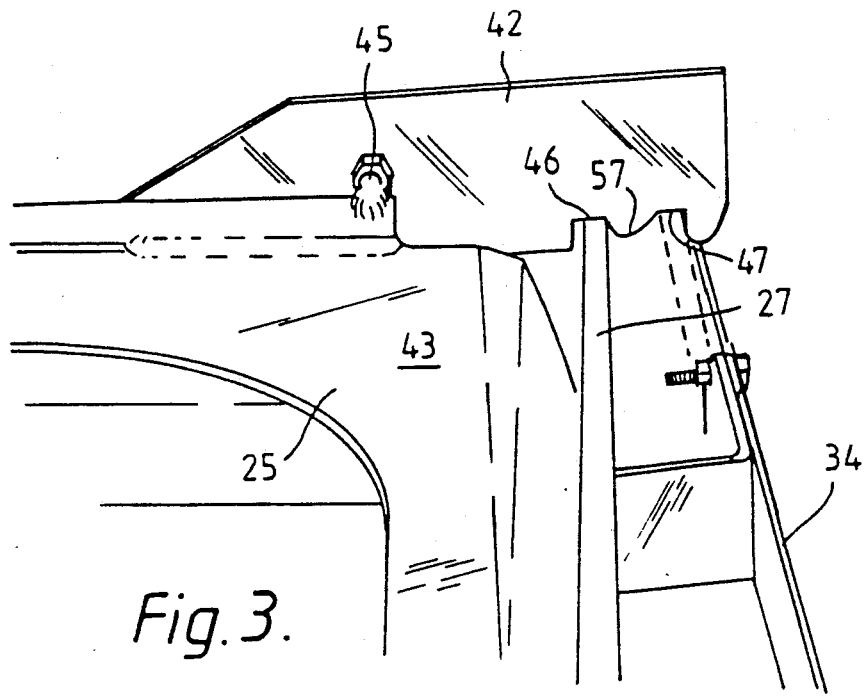
FIGS. 3 and 4 are perspective views illustrating part of the loading mechanism of FIG. 2.

A detent plate 42 is attached to the clamp so as to retain the lever arm 27 in one of two possible positions corresponding to the respective positions of roller 40. Referring specifically to FIGS. 3 and 4, there can be seen the detent plate 42 which is pivotally connected to the clamp 25 at its corner 43. The detent plate 42 extends beyond the edge 44 of the clamp 25 and pivots about a pivotal connection 45. The lever arm 27 is illustrated located in a first recess 46 in FIG. 3 but after the abutment 29 has engaged with the striker plate 30, the lever arm 27 will move over the ridge 47 into a second recess 47 as illustrated in FIG. 4. The detent plate is preferably spring biased downwardly toward the lever arm 27 by a spring 58.

Figure 6:
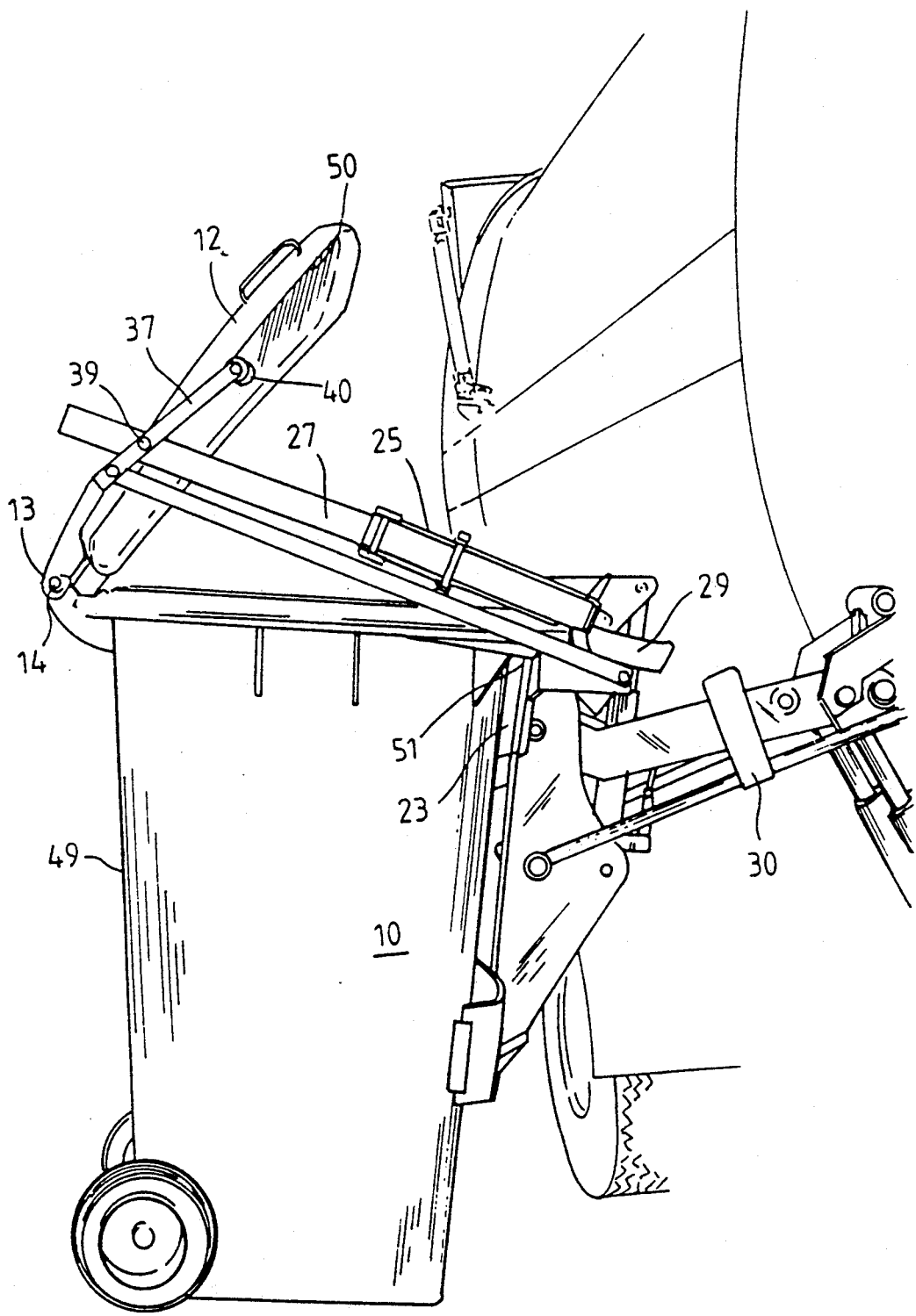

Referring to FIGS. 5 and 6, the operation of the loading mechanism and the lid opening device will now be described.

Referring first to FIG. 5, the loading mechanism 20 is illustrated fully extended and an engaged bin 10 is being emptied into hopper 48. It will be realised that in this position the bin lid 12 shown in phantom is pivoted about the wheeled side 49 of the bin 10 and in the position illustrated, the lid is open. As is illustrated in FIG. 5, the abutment 29 of the arm 27 is pressed against striker plate 30 and it will be appreciated that the camming surface of plate 30 has acted on lever arm 27 and thereby roller 40 will have moved inwardly toward the clamp 25 and the lever arm 27 will be retained in the recess 47 of the detent means 42.

In this position, the roller 40 is now located between the lid 12 and the bin 10 and is in the lid engagement position. The roller 40 will remain in this position until the abutment 29 engages with the camming surface of striker plate 31 as the bin 10 is being returned to its rest position.

Referring now to FIG. 6, the loading mechanism is now illustrated part way from the emptying position to the rest position of bin 10 and as is shown, the roller 40 is still in the lid engagement position and is riding along the inner lip 50 of the bin lid 12. The clamp 25, which is partially concealed by the lever arm 27, is being raised relative to the finger plate 23 which is still engaged with the lip 51 of the bin 10. As the clamp 25 is raised, the lever 37 pivots about pivot 39 and the roller 40 acts on the lid 12 to pivot the lid 12 about hinges 13 and 14 to open the lid and leave the bin in the position illustrated in FIG. 1 once the bin has been returned to its rest position and the finger plate 23 has disengaged the lip 51. Thus the normally concealed message is now exposed on the underside of the lid. If it is desired to leave the lid closed the lid opening device can be readily removed from the loading mechanism and only need be used on those days where a subsequent collection is to occur.

Figure 7:
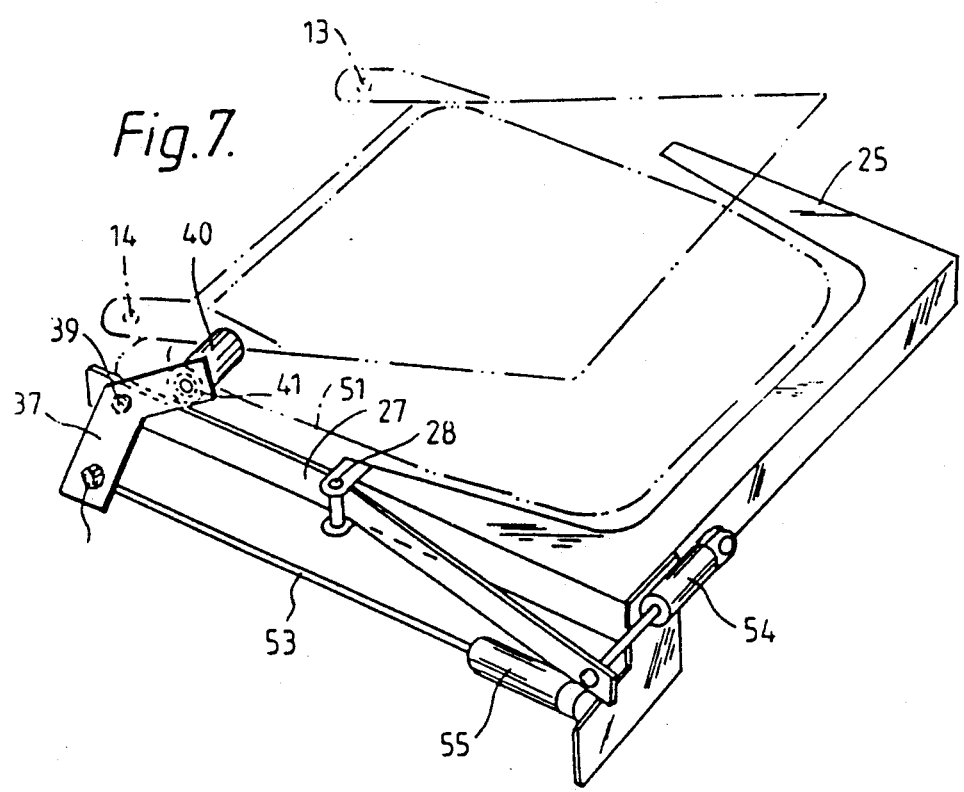
FIG. 7 is a perspective similar to that of FIG. 4 view illustrating an alternative embodiment of a loading mechanism constructed in accordance with the present invention.

Referring now to FIG. 7, there is illustrated a further embodiment of the present invention and like numerals have been used to illustrate like features. In this case, the lever arm 27 and the lever 37 are driven by rods 52 and 53 respectively. The rods 52 and 53 extend from solenoids 54 and 55. The solenoids 54 and 55 are driven and controlled electrically to firstly pivot arm 27 so that roller 40 is located between lid 12 and the bin lip 51 when the bin is in its emptying position and secondly as the bin reaches its rest position, the solenoid 55 is activated to retract rod 53 and cause lever 37 to open the bin lid 12 so that it is positioned as is illustrated in FIG. 1. Solenoid 54 is then activated to retract rod 52 and thereby withdraw roller 44.

The present invention also embodies a method for the collection of recyclable waste material by using a loading mechanism according to the present invention.

Domestic refuse is usually collected at regular weekly intervals. Most of the refuse is a mixture of recyclable waste, food wastes and other generally non-recyclable material. The recyclable component is usually a small fraction of the whole. Thus weekly collections of the recyclable portion would be uneconomical and inefficient. In most cases, monthly collections of recyclable waste would be sufficient. However, some homeowners may require more or less frequent collections.

The loading mechanism and method of the present invention greatly increases the efficiency of refuse collection where such collection boundary conditions are concerned.

One way of using the present invention is to provide two collections on the one day. The first collection would involve emptying of bins containing non recyclable domestic refuse. This collection would be the normal weekly collection. However, the closure member opening means would be employed and all emptied bins would have their closure members left opened. In the case where the closure member was of the type illustrated in FIG. 1 the bin lids would be left open exposing the message to the homeowner.

This would signal to the homeowner that a further collection was to be made later that day and depending on the nature of the signal the homeowner would be prompted to place recyclable waste material into the bin and to close the lid.

The second collection would then be made, but only those bins which have their closure members closed would be emptied, in the case of the preferred embodiment those bins with their lids closed would be emptied.

Where a retractable arm assembly or hoist is employed a single operator could provide the collection service since in this case the loading mechanism can be operated by remote control from the refuse vehicle cabin.

It is clear therefore that by employing the present invention an efficient collection of recyclable waste material can be put into practice.

While this invention can been particularly shown and described with reference to certain preferred embodiments, it will be readily appreciated by those of ordinary skill in the art that various changes and modifications may be made therein without departing from the spirit and scope of the invention. It is intended that the appended claims be interpreted as including the foregoing as well as such other changes and modifications.

What I claim is:

1. A refuse vehicle comprising a vehicle body, a retractable arm assembly having one end mounted to the vehicle body, a retractable arm assembly having one end mounted to the vehicle body, a loading mechanism being mounted to the other end of said retractable arm assembly, said retractable arm assembly being adapted to extend away from the vehicle in order for the loading mechanism to directly engage a bin having a closure member movable between open and closed positions, and on retraction of the retractable arm assembly, the loading mechanism being adapted to empty the contents of the bin into a container on the refuse vehicle during a bin emptying operation, the bin emptying operation involving movement of the bin from an initial rest position to an emptying position and then to a final rest position where the bin is released from the loading mechanism, said leading mechanism having means for opening the closure member and means for maintaining the closure member in said opened position when said bin reaches its final rest position and said loading mechanism is disengaged from said bin.

2. The refuse vehicle according to claim 1 wherein said closure member includes a hinged lid on the bin, and the closure member opening means including a lid opening device coupled to said loading mechanism.

3. A refuse vehicle as defined in claim 2 wherein said lid opening device includes an arm having a proximal end and a free end, said arm being detachably secured to said loading mechanism adjacent its proximal end and lid engagement means being provided adjacent the free end of the arm and said lid opening device can be activated to thereby move said lid engagement means between a lid disengaged position and a lid engaged position whereupon said lid opening device operates to open the lid.

4. The refuse vehicle of claim 3 wherein said lid engagement means includes a first class lever pivotally connected adjacent the free end of said arm, said first class lever having at one end a roller adapted to contact a bin lid and a connecting rod pivotally connected at the other end, said connecting rod being operable to pivot said first class lever during an emptying operation to move said roller between said lid disengaged and engaged positions.

5. The improvement of claim 4 further including detent means to inhibit movement of said arm.

6. A refuse vehicle as defined in claim 3 wherein said arm includes a lever arm pivotally connectable to said loading mechanism at a point intermediate the ends of said lever arm, and camming surfaces adapted to strike said lever arm adjacent its proximal end at different stages during an emptying operation, so that said lever arm pivots to move said lid engagement means between its respective positions.

7. The refuse vehicle of claim 6 further including drive means couplable with said arm adjacent its proximal end, said drive means being adapted to drive said arm to move said lid engagement means between its respective positions.

8. The improvement of claim 7 wherein said drive means includes a solenoid coupled to said lever arm adjacent the proximal end of said lever arm via a solenoid connecting rod.

9. In a loading mechanism for a refuse vehicle, the loading mechanism during a bin emptying operation moving a bin having a closure member from an initial rest position to an emptying position and then to a final rest position, the improvement comprising closure member opening means provided in conjunction with said loading mechanism to open the closure member to the bin prior to the bin achieving the final rest position, said closure member opening means including a lid opening device adapted to automatically open the lid of the bin, the lid opening device including an arm having a proximal end attachable to the loading mechanism and a free end remote from the loading mechanism, and having a lid engagement means such that when operatively attached to said loading mechanism, said lid opening device can be activated to move said lid engagement means between a lid disengaged position to a lid engaged position whereupon said lid opening device can operate to open the lid of the bin, said lid engagement means including a first class lever pivotally connected adjacent the free end of the arm, said first class lever having a roller adapted to contact a bin lid at one end a connecting rod pivotally connected at the other end, said connecting rod being operable to pivot said first class lever during an emptying operation.

10. The improvement of claim 9 and further including detent means to inhibit movement of said arm.

* * * * *